(12) United States Patent
Beith et al.

(10) Patent No.: US 7,848,494 B2
(45) Date of Patent: *Dec. 7, 2010

(54) SYSTEM AND METHOD FOR CAPTURE AND STORAGE OF FORWARD AND REVERSE LINK AUDIO

(75) Inventors: Scott Beith, San Diego, CA (US);
Bilhan Kirbas, San Diego, CA (US);
Maria-Ellen Christy, Santa Ana, CA (US)

(73) Assignee: Kyocera Corporation, Kyoto (JP)

( * ) Notice: Subject to any disclaimer, the term of this patent is extended or adjusted under 35 U.S.C. 154(b) by 1076 days.

This patent is subject to a terminal disclaimer.

(21) Appl. No.: 11/419,283

(22) Filed: May 19, 2006

(65) Prior Publication Data

US 2006/0200742 A1  Sep. 7, 2006

Related U.S. Application Data

(63) Continuation of application No. 10/179,721, filed on Jun. 24, 2002, now Pat. No. 7,050,551.

(51) Int. Cl.
*H04M 11/00* (2006.01)
*G10L 15/26* (2006.01)

(52) U.S. Cl. .................................. 379/88.14; 704/235

(58) Field of Classification Search ................ 379/67.1, 379/88.13, 88.14, 88.19, 88.22, 355.01–355.05; 455/414.1, 564

See application file for complete search history.

(56) References Cited

U.S. PATENT DOCUMENTS

| 5,561,056 A | 10/1996 | Brons et al. |
| 5,651,056 A * | 7/1997 | Eting et al. ............... 379/88.01 |
| 6,321,098 B1 * | 11/2001 | Beith et al. .................. 455/564 |
| 6,665,547 B1 * | 12/2003 | Ehara .......................... 455/563 |
| 2001/0049676 A1 * | 12/2001 | Kepler et al. .................... 707/3 |
| 2002/0172332 A1 | 11/2002 | Carroll et al. |
| 2003/0026392 A1 * | 2/2003 | Brown et al. ............. 379/88.13 |

FOREIGN PATENT DOCUMENTS

JP  06-037878  2/1994

* cited by examiner

*Primary Examiner*—Fan Tsang
*Assistant Examiner*—Solomon Bezuayehu

(57) ABSTRACT

A system and method for capturing and storing audio information from the forward or reverse link is disclosed. A communication device receives audio information via the forward or reverse link channel. The audio information is parsed and processed by voice recognition in order to translate the audio information into text information. Alternatively, the audio information may be recorded by the communication device and stored in memory for later processing. Once captured and translated, the text information can be edited and stored in various databases integral to the communication device. Additionally, when the text information comprises a telephone number, the communication device can place a call to that telephone number.

7 Claims, 4 Drawing Sheets

SYSTEM AND METHOD FOR CAPTURE AND STORAGE OF FORWARD AND REVERSE LINK AUDIO

RELATED APPLICATIONS

This is a continuation of U.S. application Ser. No. 10/179,721, filed Jun. 24, 2002, now U.S. Pat. No. 7,050,551 which is hereby incorporated by reference.

FIELD OF THE INVENTION

The present invention is generally related to wired and wireless communications and more specifically related to capturing and storing desirable audio information from the forward link.

BACKGROUND OF THE INVENTION

Directory assistance is a service provided by telephone companies and wireless network providers to help their customers obtain desired phone numbers. Customers call into the directory assistance service and provide information to an operator pertaining to the desired number. Once the operator locates the desired number, he reads the number to the customer or initiates a pre-recorded or computerized recital of the number. Although the directory assistance service was initially proven to be convenient, it remained cumbersome to customers because of the difficulty in memorizing or writing down the desired number provided by the service.

To alleviate this significant problem with the directory assistance system, most telephone companies and wireless network providers now offer a fee based connection service that allows customers to be directly connected to the desired number without having to hang up and dial the desired number themselves. Consequently, the customers are not required to memorize or write down the desired number.

Although the fee based connection service may be convenient, it is undesirable to those customers who do not wish to pay the connection fee. Another significant drawback of the fee based connection service is that accepting the operator assisted connection plagues customers with the perpetual need to call the directory assistance service because the customer is not required to memorize or write down the desired number for future use and therefore becomes dependent on the service.

Therefore, there is a pressing need for a system that allows for the capture and storage of audio information received on the forward link of a communication device.

SUMMARY OF THE INVENTION

Communication device users who receive contact information over the phone often find it difficult to remember the information long enough to enter that information into the contact database on the communication device. To be sure, communication device users are rarely able to remember the information long enough to dial a telephone number received from a friend or from a directory assistance service.

The present invention provides a system and method for capturing audio information received via the forward link and translating that audio information into text that can be stored in a database on the communications device. Additionally, the present invention provides the ability for a communication device to dial a telephone number in the case where the received audio information includes a telephone number.

The capture of audio information can be initiated automatically or by direct user input. Once the audio information has been captured and translated by a speech to text engine or other voice recognition utility, the information is presented to the user with options to save the information, dial any received telephone numbers, or both. Alternatively, the translated audio information can be automatically saved. Other features and advantages of the present invention will become more readily apparent to those of ordinary skill in the art after reviewing the following detailed description and accompanying drawings.

DETAILED DESCRIPTION OF THE INVENTION

Certain embodiments as disclosed herein provide systems and methods for capturing and storing desired information from forward link audio. For example, one method as disclosed herein allows for a communication device to filter the audio content received on the forward link. When desired audio content is recognized, the communication device converts the audio content to text and stores the text information in an appropriate data storage area.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
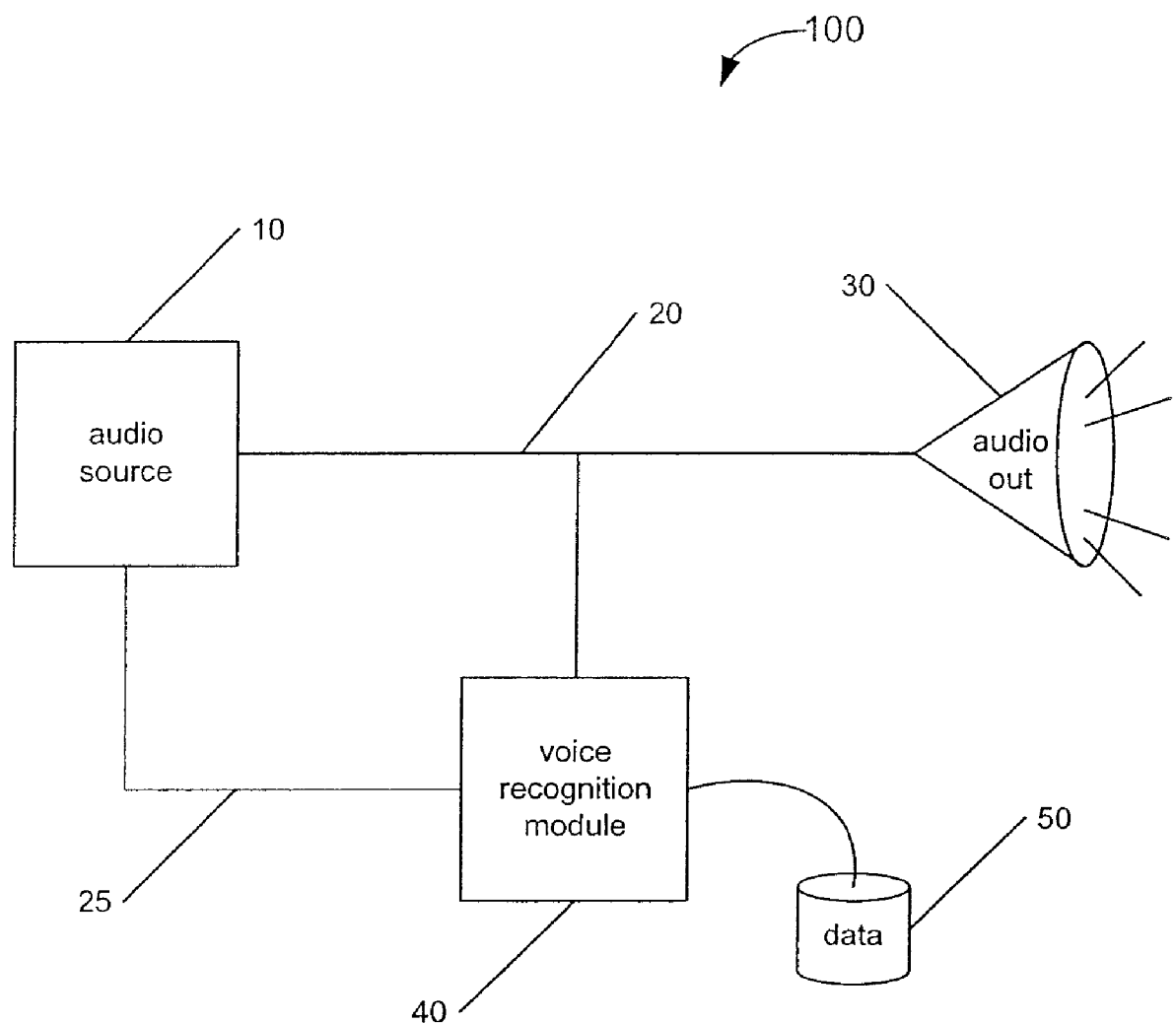
FIG. 1 is a high level block diagram illustrating an example system for capture and storage of forward link audio.

FIG. 1 is a high level block diagram illustrating an example system 100 for capture and storage of forward link audio. System 100 comprises an audio source 10, a forward link channel 20, an audio out 30, and a voice recognition module 40 that is communicatively coupled with a data storage area 50.

The audio source 10 is communicatively coupled with the forward link channel 20 and can be any of a variety of audio sources. For example, the audio source 10 may be an antenna that receives audio data from a wireless communication network. Additionally, the audio source 10 may be a transceiver configured to receive communications from a wired communication network such as a telephone network. In each case, the audio source 10 is capable of manipulating the audio signal such that a consistent audio signal is delivered to the forward link channel 20.

The forward link channel 20 receives audio signals from the audio source 10 and conveys those signals to the audio out 30 and the voice recognition module 40. The forward link channel 20 can be implemented as any of a variety of communication busses. Systems for providing audio from an audio source 10 to an audio out 30 are well known and will therefore not be discussed in detail. However, it is important to note that the voice recognition module 40 may be passively coupled with the forward link channel 20 or may be switched into the forward link channel 20.

In an alternative embodiment, the audio source 10 may also be a microphone that is integral to a communication device. In such an embodiment, the audio signal is conveyed from the audio source 10 to the voice recognition module 40 via the reverse link channel 25. The reverse link channel 25 can be implemented as any of a variety of communication busses. As previously described, the voice recognition module 40 may be passively coupled with the reverse link channel 25 or may be switched into the reverse link channel 25.

In one embodiment, the passively coupled voice recognition module 40 is capable of receiving all data that is sent on the forward link channel 20. In an alternative embodiment, a switched voice recognition module 40 is capable of receiving data on the forward link channel 20 when the switch is activated. Activation of the switch causes the voice recognition module 40 to be in electrical communication with the forward link channel 20.

The voice recognition module 40 may be implemented with an integral computer readable medium (not shown). Alternatively, the module 40 may be in electrical communication with an external computer readable medium. Advantageously, the computer readable medium can provide the instructions (i.e., computer executable code) that cause the voice recognition module 40 to determine when to carry out its activities, for example, when to activate the switch, when to begin reading data from the forward link channel 20, or when to begin converting speech to text.

In this description, a computer readable medium is defined as a means for providing executable code, programming instructions, and software to the system 100. The term "computer readable medium" is used to refer to any media used to provide computer executable code (i.e., computer programs or software) to the system 100. Computer programs can also be stored in memory or received via the audio source 10. Such computer programs, when executed, enable the system 100 to carry out its designed functionality, in particular capturing and storing audio from the forward link channel 20.

The voice recognition module 40 is communicatively coupled with a data storage area 50. The data storage area 50 may be implemented as a semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The data storage area 50 may also be implemented as a hard disk drive and/or a removable storage drive, for example a memory stick, floppy disk, a mini disc, a compact disc ("CD"), a digital versatile disc ("DVD"), etc. Other example implementations of data storage area 50 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Additionally, data storage area 50 may logically comprise one or more databases adaptable for storage of desired information.

Figure 2:
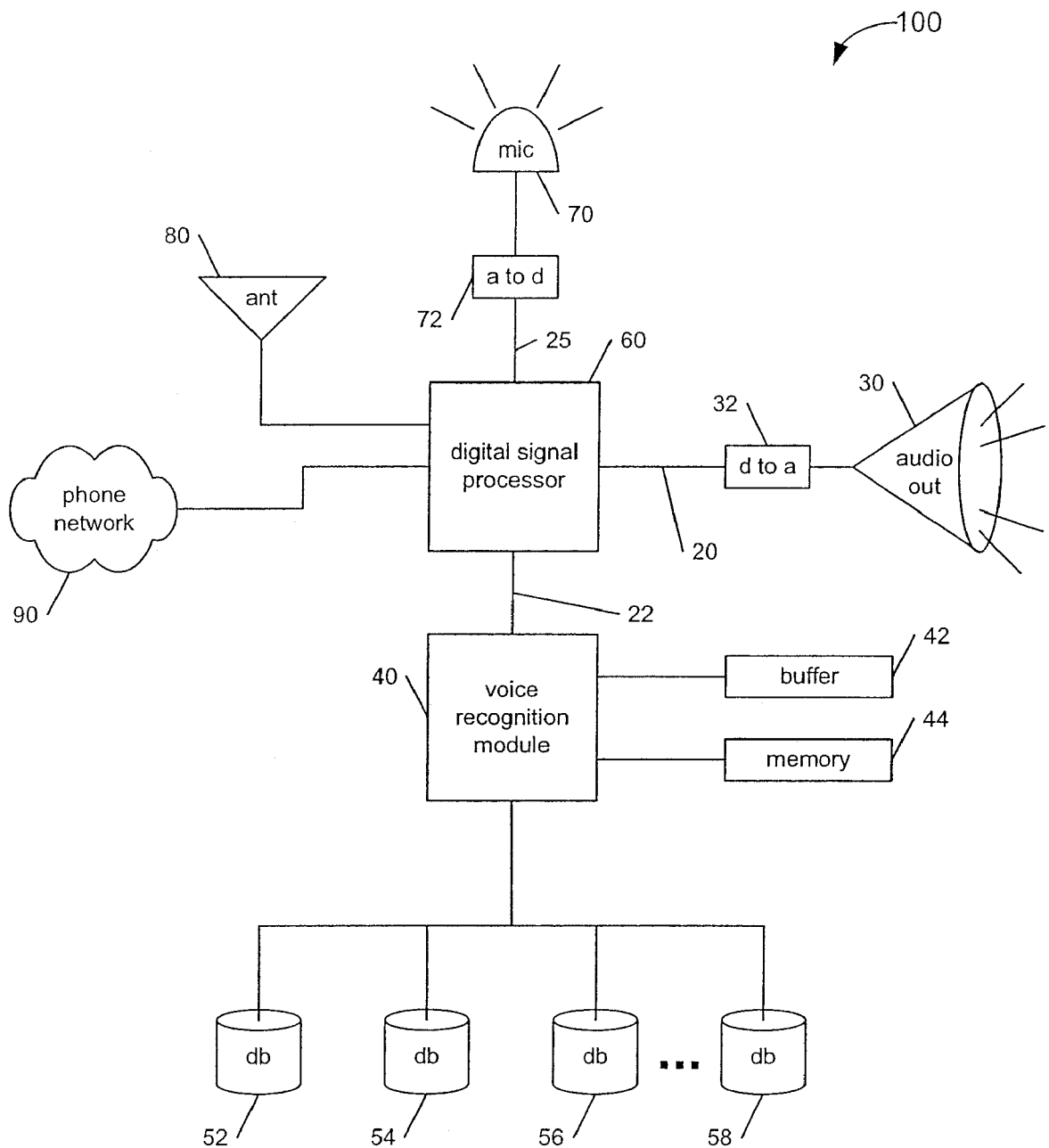
FIG. 2 is a system level block diagram illustrating an example system for capture and storage of forward link audio.

FIG. 2 is a system level block diagram illustrating an example system 100 for capture and storage of forward link audio. System 100 comprises a digital signal processor ("DSP") 60 that is adaptable to receive audio from more than one source, namely, microphone 70 (through analog to digital converter 72), antenna 80, and telephone network 90. DSP 60 preferably refines and normalizes the received audio signal and delivers the processed audio signal over the forward link channels 20 and 22 to its destination, for example audio out 30. Various alternative implementations of the portion of system 100 that receives and refines audio signals and then places those signals on the forward link channel will be recognized by those having skill in the art.

DSP 60 may also discriminate as to which forward link channel receives the audio signal. For example, the switching process described above with respect to the voice recognition module 40 in FIG. 1 may be implemented in DSP 60. Thus, DSP 60 may always provide the audio signal to forward link channel 20 but only provide the audio signal to forward link channel 22 when forward link audio is to be captured and stored.

Voice recognition module 40 is advantageously communicatively coupled with DSP 60 over forward link channel 22. In one embodiment, voice recognition module 40 may instruct DSP 60 when to provide forward link audio over the forward link bus 22. Alternatively, DSP 60 may determine when to provided forward link audio over the forward link bus 22 while voice recognition module 40 is configured to process all signals received via the forward link bus 22. Thus, in alternative embodiments, control of the process may be implemented in different components of the system 100.

Voice recognition module 40 may also be coupled with a buffer 42 and a memory 44. These components may be external from or integral to voice recognition module 40. Voice recognition module 40 preferably employs buffer 42 to hold audio content received from the forward link channel 22. In an embodiment where voice recognition module 40 receives all audio signals processed by DSP 60, voice recognition module 40 can place the received audio signals in buffer 42 for storage. Advantageously, buffer 42 may provide a preferred amount (measured in time) of stored audio signals, for example, the previous ½ second. Therefore, when the process for capturing and storing audio signals begins, the preferred amount of audio signals are instantly available to voice recognition module 40.

An example at this point will help illustrate the benefit of continuously storing the last ½ second (or some other desirable amount) of audio in buffer 42. In an embodiment where the user initiates the process by pressing a button or speaking a command, the user's instruction may be delayed by the time it takes the user to press a key on the communication device or the time it takes to speak the command. Thus, if the user input is modestly late, the system can still successfully perform the operation because it begins its process with audio content from just prior to the time when the instruction was given.

Voice recognition module 40 is also coupled with a memory 44. Memory 44 can be a volatile memory or a persistent memory. Preferably, memory 44 can be used by voice recognition module 40 to store converted text. For example, as voice recognition module 40 processes the signal received from the forward link channel 22, the text that is generated can be temporarily stored in memory 44. Once the text stored in memory 44 completes a desired data element, the text can be transferred from memory 44 to persistent memory, such as databases 52, 54, 56, and 58.

Databases 52, 54, 56, and 58 preferably comprise data storage area 50 (previously described with respect to FIG. 1). As indicated by the ellipse between database 56 and database 58, additional databases may be employed. Preferably, each separate database contains different types of information. For example, in a communication device, separate databases may be used to house (1) phone book; (2) favorites; (3) directory assistance numbers; (4) last 10 dialed numbers; (5) missed calls; (6) and last 10 incoming calls, just to name a few. Additionally, each of these so called separate databases may in fact merely be separate views into a single database. The various advantages of the different implementations will be well understood by those having skill in the art. The desired function, however, is to logically separate different types of information for presentation whether implemented as separate databases or a single database.

Figure 3:
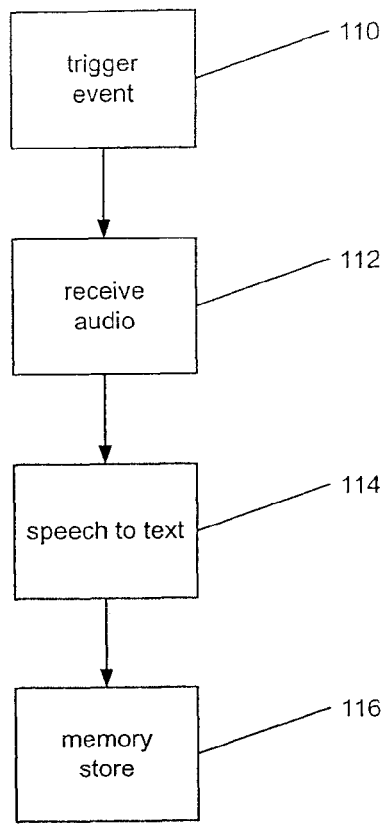
FIG. 3 is a high level flow diagram illustrating an example method for capture and storage of forward link audio.

FIG. 3 is a high level flow diagram illustrating an example method for capture and storage of forward link audio. Initially, in step 110, a trigger event happens that sets the process in motion. The trigger event is preferably a programmable variable that can be set to any number of events. For example, the capture process may automatically begin when the number for information is dialed. The number for information can be set in a system variable so that changes to the number based on region or network can be reflected. Additionally, there may be more than one number that is identified as the number that triggers the beginning of the process.

Alternatively, or in combination, another trigger event may be a particular input. The input may be in the form of a voice command, a menu selection, a mouse click, a button push, or any of a variety of other user input mechanisms. Advantageously, allowing a particular input to trigger the process lets a manual (or otherwise non-automatic) initiation scheme to be used in combination with the automatic initiation schemes to provide the best service and most flexibility.

Once the process has commenced, the system begins to receive audio, as shown in step 112. In one embodiment, the audio may have been available prior to the trigger event, although it was being ignored. Once the trigger event happens, the system begins capturing the audio from the forward link channel. Advantageously, the system may also employ the use of a buffer to store a certain amount of time of the audio signal so that when the trigger event is received, the system can immediately begin processing the audio signal from the buffer.

Once the system begins processing the audio, it begins converting the speech to text, as shown in step 114. Conventional speech to text engines may be employed to carry out this function. The text that is generated is then parsed in order to obtain the desired type of text. For example, the system may be configured to filter out everything except for numbers so that telephone numbers may be gleaned from a directory assistance service, from a voice mail message, or from a live speaker on the other end of the phone. Alternatively, the system may be configured to recognize keywords such that the converted text between each keyword is stored in the appropriate field in a contacts list.

For example, the system may encounter the keyword "LAST NAME" and then store all text between that keyword and the following "FIRST NAME" keyword in the last name field of an electronic phone book. Such an embodiment may be highly desirable in a sophisticated and mobile corporate environment.

Once the speech has been converted to text and the desired text has been parsed out of the textual data, the text is then stored in memory, as illustrated in step 116. The text may be stored in a volatile memory pending instructions from the user as to how or where to store the data. For example, the user may provide instructions regarding the database in which the information should be permanently stored. Alternatively, the information may be stored in persistent memory, for example, in a default location such a "411" list or a most recently called list. Other examples of databases or data collections in which the information may be stored include a phone book, a scratchpad, a favorites collection, a collection of phone numbers with no names, etc. The key element in this step is to electronically store the information so that it does not need to be memorized or written down for persistent storage.

Figure 4:
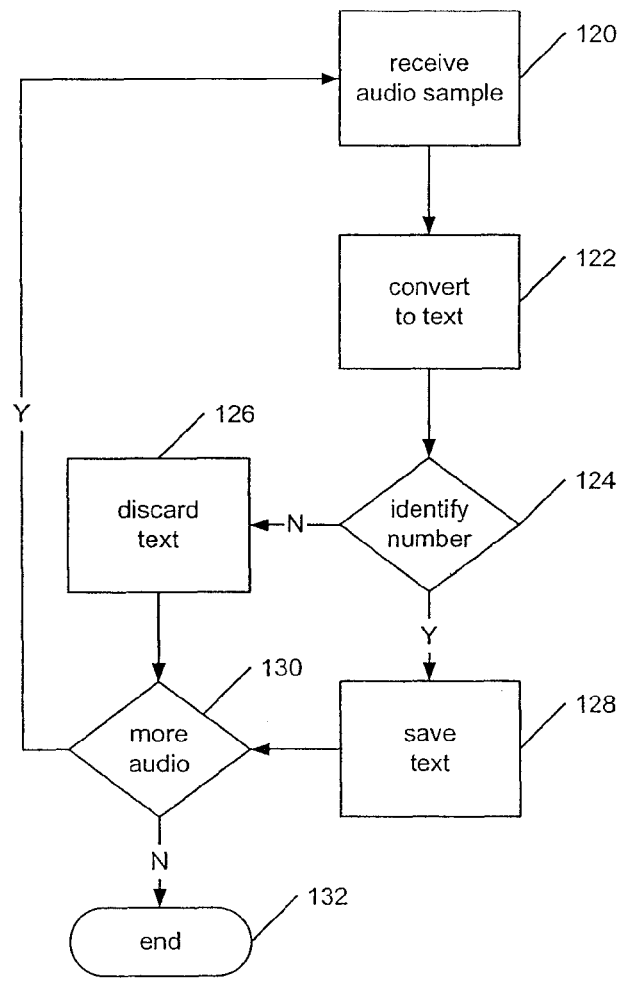
FIG. 4 is a flow diagram illustrating an example method for extracting a telephone number from a forward link audio stream.

FIG. 4 is a flow diagram illustrating an example method for extracting a telephone number from a forward link audio stream. Initially, in step 120, a sample of audio is received. The audio is then converted to text as shown in step 122. The conversion from audio to text can be carried out by a conventional speech to text converter, as previously discussed. Advantageously, the converted text can be examined to determine if the text is numeric or alphabetic, as illustrated in step 124. If the text is not a number, it can be discarded, as shown in step 126. If the text is a number, it is saved in step 128. The system next checks to see if more audio is available, as illustrated in step 130. If more audio is available, the process returns to step 120 to receive another audio sample. If no more audio is available, the process is complete and ends in step 132.

Alternative methods for this process may also be employed. For example, the audio may be received as a continuous stream and the converted alphabetic characters stored in a buffer until a numeric character is encountered. The buffer may at that time be flushed and the numeric character stored in the buffer. Additional numeric characters could then be stored in the buffer until an alphabetic character is encountered. At that point, the string of numeric text could be saved, the buffer flushed, and the process of storing alphabetic characters in the buffer repeated. This process may advantageously be more efficient or use less CPU cycles of the controlling device.

Because many alternative procedures may be used to implement this and other processes described herein, it is important to note that the function of this process is to derive strings of numbers and in particular telephone numbers from the converted text. Telephone numbers can be identified by their nature of being a fixed string of 10 digits including area code, prefix, and suffix. Advantageously, a predefined area code may be established and applied to numbers identified that contain only 7 digits.

Figure 5:
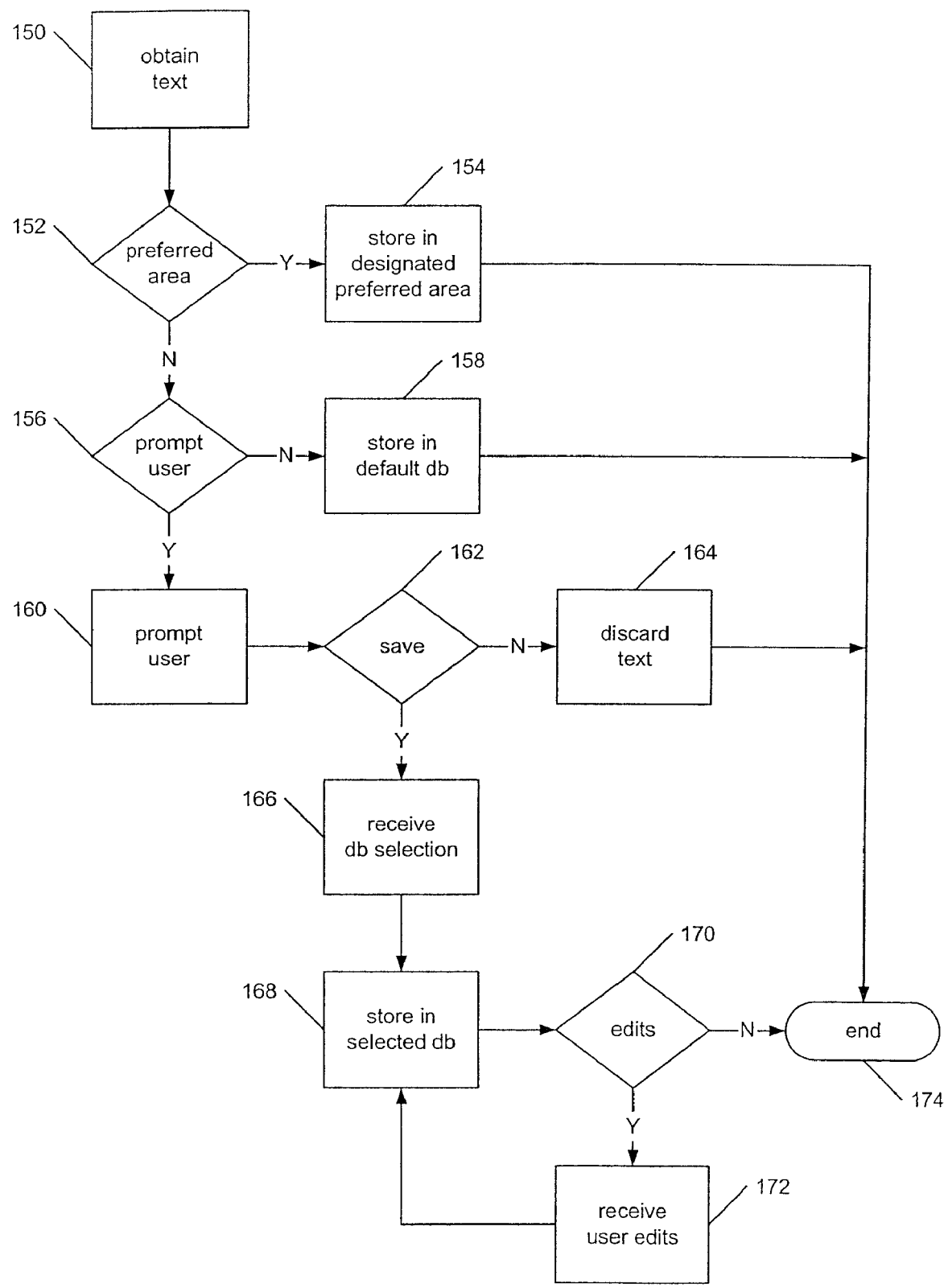
FIG. 5 is a flow diagram illustrating an example method for storing a telephone number extracted from the forward link.

FIG. 5 is a flow diagram illustrating an example method for storing a telephone number extracted from the forward link. The process begins when the system obtains the text to be stored, as illustrated in step 150. The number may be stored in volatile or persistent memory. Preferably, the process is used to store the number in persistent memory.

Once the text to be stored has been obtained, the system determines if a preferred area has been designated for saving text, as shown in step 152. If a preferred storage area has been designated, then the text is stored in the identified area, as presented in step 154. Once the text has been stored, the process is complete, as indicated in step 174.

If no preferred storage area has been established, the system determines if the user should be prompted for instructions as to where to store the text, as shown in step 156. For example, the user may predefine whether to prompt for a storage location or simply use the default storage location. Advantageously, such a setting can be implemented as a software parameter that allows a user to modify the selection when convenient to do so.

If the system determines that the user should not be prompted for instructions, the text is then stored in the default location, as illustrated in step 158. A default location, for example, may be a scratchpad area, a contacts list, or a "411"

or directory assistance folder. Once the text has been stored, the process is complete, as shown in step 174.

If the system determines that the user should be prompted for instructions, then the user is prompted for instructions, as illustrated in step 160. The user may be prompted by voice command or preferably by presenting the user with a series of choices on the screen of the device. For example, a set of available storage areas (databases or data collections) may be present to the user for selection. Additionally, the user may be presented with the option to not save the text at all, as shown in step 162. If the user elects to not save the text, then the text can be discarded as seen in step 164 and process completes in step 174.

If the user elects to save the text, then the system receives the desired location for storing the text as shown in step 166. For example, in a system that contains a contacts list, the user may elect to store the text in conjunction with one of the entries in the contacts list. Once the system has been instructed as to where to store the text, the information is saved in the appropriate area, as illustrated in step 168. After the information has been stored the system may provide the user with the ability to edit the information, as shown in step 170. For example, if the information includes only a telephone number, the user may desire to add a name or a note to the information. Once the system has received the user edits, the updated or new information may once again be stored in the selected area, as shown in step 168. This process of editing the information may iterate any number of times until the user is satisfied with what has been stored. When the editing process is complete and the information has been stored, the process completes as shown in step 174.

In an alternative embodiment, the iterative editing process may take place prior to the system saving the information in persistent storage. Advantageously, this process may be more efficient and consume less power and resources on the device that is interacting with the user.

While the particular systems and methods for capturing and storing forward or reverse link audio herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A device comprising:
   a processor configured to receive real time audio content from an audio channel and to send the real time audio content to an audio out module on a communication device, the processor further configured to detect a trigger event to capture and store information from the real time audio content;
   a buffer coupled to the processor, the buffer configured to store a predetermined amount of most recent real time audio content, where the predetermined amount is less than the total real time audio content received from the audio channel, the buffer further configured to, in response to said trigger event, store new real time audio content received after the trigger event;
   a voice recognition module coupled to the processor, the voice recognition module configured to prepend the stored predetermined amount of audio content to the stored new audio content, wherein the stored predetermined amount of audio content and the stored new audio content are substantially temporally contiguous, the voice recognition module further configured to convert the stored predetermined amount of audio content and the stored new audio content to textual data and to parse the textual data to obtain a data element; and
   a memory coupled to the voice recognition module, the memory configured to store the data element.

2. The device of claim 1, wherein the audio channel is a forward link channel.

3. The device of claim 1, wherein the audio channel is a reverse link channel.

4. The device of claim 1, wherein the data element is a telephone number.

5. The device of claim 4, wherein the voice recognition module is further configured to discard non-numerical textual data, save numerical textual data in a volatile memory, and examine the numerical textual data in the volatile memory to identify a complete telephone number.

6. The device of claim 1, wherein the trigger event comprises pressing a key on the communication device.

7. The device of claim 1, wherein the trigger event comprises dialing a directory assistance telephone number.

* * * * *